United States Patent [19]

Suzuki

[11] Patent Number: 5,398,549

[45] Date of Patent: Mar. 21, 1995

[54] FLOWMETER SENSOR

[75] Inventor: Isao Suzuki, Tokyo, Japan

[73] Assignee: MKS Japan, Inc., Tokyo, Japan

[21] Appl. No.: 897,796

[22] Filed: Jun. 12, 1992

[30] Foreign Application Priority Data

Jun. 13, 1991 [JP] Japan .................. 3-181516

[51] Int. Cl.$^6$ .................................. G01F 1/68
[52] U.S. Cl. ........................................ 73/204.26
[58] Field of Search ........... 73/204.25, 204.26, 204.27, 73/204.22, 204.24

[56] References Cited

U.S. PATENT DOCUMENTS

| | | | |
|---|---|---|---|
| 3,802,264 | 4/1974 | Poppendiek et al. | 73/204.24 |
| 4,425,792 | 1/1984 | Kohama et al. | 73/204.27 |
| 4,448,070 | 5/1984 | Ohyama et al. | 73/204.26 |
| 4,464,932 | 8/1984 | Ewing et al. | 73/204.15 |
| 4,522,058 | 6/1985 | Ewing | 73/202 |
| 4,571,801 | 2/1986 | Ewing . | |
| 4,616,505 | 10/1986 | Jouwsma | 73/204.26 |
| 4,679,585 | 7/1987 | Ewing . | |
| 4,815,280 | 3/1989 | Tujimura et al. | 73/204.22 |
| 4,877,051 | 10/1989 | Day . | |
| 5,094,105 | 3/1992 | Emmert et al. | 73/204.25 |

Primary Examiner—Richard E. Chilcot, Jr.
Assistant Examiner—Harshad Patel
Attorney, Agent, or Firm—Wenderoth, Lind & Ponack

[57] ABSTRACT

A flowmeter sensor includes a sensor tube, and a heater/resistor through which the sensor tube passes. The heater/resistor includes a substantially cylindrical sleeve fitted around the sensor tube and made of ceramic. A thin film of platinum is deposited on the sleeve and is then partially removed by a laser to provide a helical resistance pattern. A pair of electrically conductive rings are tightly fitted around opposite ends of the ceramic sleeve and serve as bases to be connected with a corresponding pair of leads.

6 Claims, 2 Drawing Sheets

FLOWMETER SENSOR

BACKGROUND OF THE INVENTION

1. Field of the Invention

The present invention relates to a flowmeter sensor for measuring the flow of a gas or other fluid used in the manufacture of semiconductors.

2. Description of the Related Art

A conventional flowmeter sensor includes a conduit (sensor tube) through which a fluid flows, and a temperature-sensitive resistance wire wound on the outer periphery of the sensor tube as exemplified in U.S. Pat. No. 4,815,280.

In the prior art flowmeter sensor, the sensor tube has quite a small diameter, approximately 1 mm, and the temperature-sensitive resistance wire has a diameter of approximately 0.02 mm. As such, it is cumbersome to wind the temperature-sensitive resistance wire on the sensor tube. It is also cumbersome to adjust the resistance value of a heater/resistor since it is determined by the number of turns of the heat-sensitive resistance wire. Another problem with the prior art flowmeter sensor is that the resistance wire is loosened when the heater/resistor is heated at a high temperature for a substantial length of time. This results in a change in the resistance value of the heater/resistor.

SUMMARY OF THE INVENTION

It is an object of the present invention to overcome the problems encountered in the prior art and to provide a flowmeter sensor which can easily and accurately adjust the resistance value of a heater/resistor, and which is highly reliable if it is heated at a high temperature for a substantial length of time.

According to the present invention, there is provided a flowmeter sensor which comprises a substantially cylindrical sensor tube through which a fluid flows, and a heater/resistor including at least one substantially cylindrical sleeve fitted around the sensor tube and made of an electrically nonconductive material and a heating element formed on the sleeve. The heating element includes a thin film of resistance material.

The film of resistance material is deposited on the sleeve and thereafter is scraped off or otherwise removed so as to provide a predetermined resistance value.

A pair of electrically conductive rings may be fitted tightly around opposite ends of the sleeve and electrically connected to the film of resistance material to facilitate the supplying of electrical current to the heater/resistor.

A corresponding pair of leads may be attached to the electrically conductive rings by resistance welding, Each lead may be in the form of a tape and has substantially the same width as the electrically conductive ring.

A plurality of sleeves may be fitted around the sensor tube and spaced a predetermined distance away from each other so as to enhance the sensitivity of the flowmeter sensor. The distance between adjacent sleeves may be changed according to the types of fluids to be sensed.

The flowmeter sensor of the present invention is capable of providing a desired resistance value by providing an appropriate width and the length of a resistance pattern formed in the film, Since each heater/resistor has a tubular base, two heaters/resistors can be moved on the sensor tube and spaced a given distance away from each other. The flowmeter sensor includes a pair of electrically conductive rings fitted tightly around opposite ends of the sleeve and adapted to be connected with a corresponding pair of leads, This arrangement eliminates the need for silver paste and allows the heater/resistor to have a constant resistance value.

According to the present invention, the film of resistance material is scraped or otherwise removed so as to provide a helical resistance pattern and cooperates with the rings fitted tightly around the opposite ends of the sleeve. This arrangement enables an easy and fine adjustment of the resistance value of the heater/resistor and thus, accurate measurement of the flow rate of a fluid.

The heater/resistor comprises a tubular element or sleeve and fitted around the sensor tube such that it can be moved to any desired position so as to adjust the sensitivity of the flowmeter sensor. Further, the film of resistance material is deposited on the sleeve which is made of ceramic so as to insulate the sensor tube from the heater/resistor. This allows the flowmeter sensor to be used at a high temperature for a substantial length of time.

These and other objects and advantages of the present invention will be apparent from the following description of preferred embodiments when taken in conjunction with the accompanying drawings.

DESCRIPTION OF THE PREFERRED EMBODIMENTS

Figure 1:
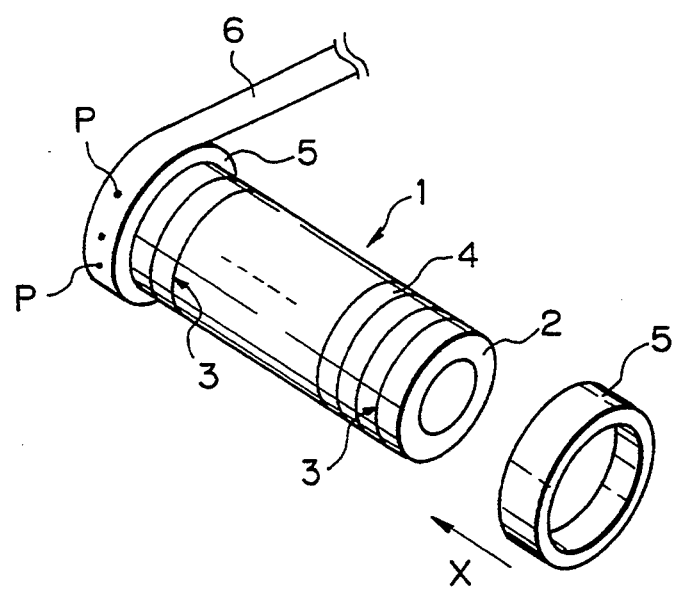
FIG. 1 is a perspective view of one embodiment of a flowmeter sensor according to of the present invention.

Referring now to the drawings and particularly to FIG. 1, a heater/resistor 1 includes a substantially cylindrical sleeve 2. The sleeve 2 is made of ceramic (alumina by 96 percent) and, for example, has an inner diameter of 0.5 mm, an outer diameter of 0.7 mm, and a length of 7 mm. The inner diameter, the outer diameter and the length of the sleeve 2 may, of course, be changed according to the diameter of a sensor tube and the types of fluids to be sensed. A thin film of platinum has a thickness of approximately 1 micron, and is deposited on the outer periphery of the ceramic sleeve 2. A pair of rings 5, 5 are made of nickel (or stainless steel) and each has a width of 0.5 mm, and a thickness of 0.7 mm. The ring 5 is forced in the direction of the arrow X and is tightly fitted around a respective end of the sleeve 2. These rings serve as bases and allow the heater/resistor to more easily and firmly be connected with leads than electrically conductive paste. Such paste is subject to uneven application. This results in an undesirable change in the temperature coefficient of the heater/resistor. The film is, then, scraped or otherwise removed by a laser (not shown) to form a void 3 providing a helical resistance pattern 4. The helical resistance pattern 4 extends between the opposite ends of the ceramic sleeve 2.

A corresponding pair of platinum foils 6 (only one is shown) extend around the rings and each has a width of 0.5 mm, and a thickness of 0.1 mm. Each foil 6 is attached as at P by resistance welding and acts as an electrical lead. The heater/resistor 1 thus made has a resistance value of 200Ω, and a temperature coefficient of 3600 PPM. Since a laser is employed to provide a resistance pattern, heater/resistors of identical properties can be fabricated on a mass production basis.

Figure 2:
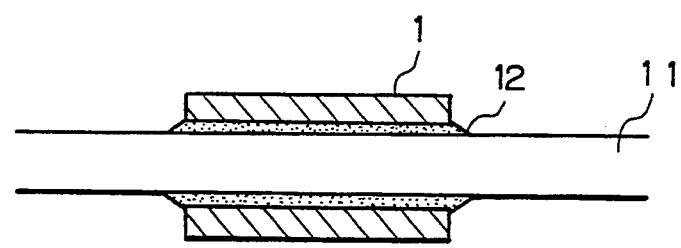
FIG. 2 is a sectional view of the flowmeter sensor in use.
Figure 3:
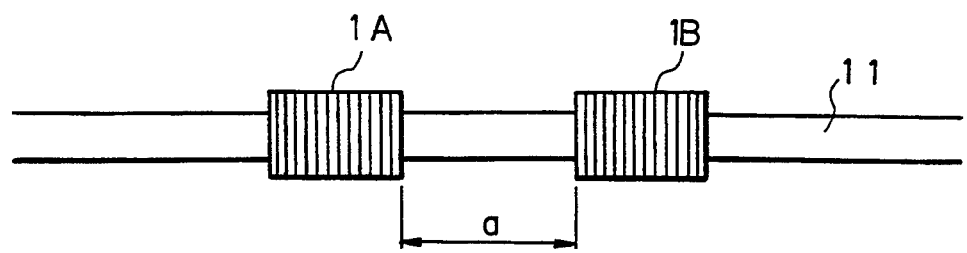
FIG. 3 is a front view of the flowmeter sensor in rise.

A stainless steel sensor tube 11 passes through two heaters/resistors 1A, 1B. As shown in FIG. 2, after the sensor tube 11 has been appropriately positioned, a polyimide resin 12 is applied between the sensor tube 11 and the sleeves and is then cured at a temperature of at least 100° C. Electrical current is then passed to heat each heater/resistor. Temperature differentials between the two heaters/resistors allows of the flow rate of a fluid flowing through the sensor tube 11 to be measured. These heaters/resistors 1A, 1B form part of a bridge circuit. It will be appreciated that the sensitivity of the flowmeter sensor of this type varies depending on the distance between the two heaters/resistors. As shown in FIG. 3, the two heaters/resistors 1A, 1B may be spaced a distance (a) away from each other to obtain a desired sensitivity. This arrangement is advantageous in that fluids of different specific heats can be measured by appropriately selecting the distance.

The thin film of resistance material may be made of any resistance materials other than platinum. Also, the sleeve may be made of any electrically nonconductive materials other than ceramic.

A minimum quantity of electrically conductive paste may be applied between the electrically conductive rings and the film of resistance material.

While the invention has been described in its preferred form, it will be obvious to those skilled in the art that it is not intended to limit the scope of the invention, and that various changes and modifications may be made therein without departing from the spirit and scope of the invention.

What is claimed is:

1. A flowmeter sensor comprising:
    a substantially cylindrical sensor tube through which a fluid is to flow;
    a heater/resistor including at least one substantially cylindrical sleeve having opposite ends and fitted around said sensor tube and made of an electrically nonconductive material, and a heating element formed on each said at least one sleeve,
    said heating element including a thin film of electrically resistive material; and
    a pair of electrically conductive rings tightly fitted around the opposite ends of said sleeve, respectively, and electrically conductively connected to said film of resistive material.

2. A flowmeter sensor according to claim 1, wherein said film of resistive material has a void therein so as to provide the film with a predetermined resistance.

3. A flowmeter sensor according to claim 1, wherein said sleeve is made of ceramic.

4. A flow meter sensor as claimed in claim 1, wherein said heater/resistor includes a plurality of cylindrical sleeves fitted around said sensor tube, and a heating element formed on each of said sleeves, said sleeves being made of an electrically nonconductive material, said sleeves being spaced a predetermined distance away from each other based on the specific heat of the fluid, the flow of which is to be measured, the sensitivity of the flowmeter being calibrated to the fluid by the spacing of the sleeves said predetermined distance, and each said heating element including a thin film of electrically resistive material.

5. A flowmeter sensor according to claim 1, and further comprising a corresponding pair of metallic leads electrically conductively connected to said pair of electrically conductive rings.

6. A flowmeter sensor according to claim 2, wherein said void has a helical shape.

* * * * *